(12) United States Patent
Wynkoop et al.

(10) Patent No.: US 10,072,394 B1
(45) Date of Patent: Sep. 11, 2018

(54) CONTROL SYSTEM AND OPERATING METHOD IN MACHINE HAVING ROTATABLE OPERATOR STATION

(71) Applicant: Caterpillar Inc., Peoria, IL (US)

(72) Inventors: Christopher Wynkoop, Eureka, IL (US); David Pavlik, Peoria, IL (US); Nicholas Dodge, Raleigh, NC (US); F. Walter Duren, Apex, NC (US); Andrew Saxsma, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/450,349

(22) Filed: Mar. 6, 2017

(51) Int. Cl.
| | |
|---|---|
| *E02F 9/20* | (2006.01) |
| *E02F 9/16* | (2006.01) |
| *E02F 3/96* | (2006.01) |
| *B60N 2/14* | (2006.01) |
| *B60N 2/225* | (2006.01) |
| *B66F 9/075* | (2006.01) |
| *B60N 2/02* | (2006.01) |

(52) U.S. Cl.
CPC ............ *E02F 9/2025* (2013.01); *B60N 2/143* (2013.01); *B60N 2/146* (2013.01); *B60N 2/2258* (2013.01); *B66F 9/0759* (2013.01); *E02F 3/961* (2013.01); *E02F 9/166* (2013.01); *E02F 9/2004* (2013.01); *B60N 2002/022* (2013.01)

(58) Field of Classification Search
CPC ......... E02F 9/2025; E02F 3/961; E02F 9/166; E02F 9/2004; B60N 2002/022; B60N 2/143; B60N 2/146; B60N 2/2258; B60N 2002/4455; B60N 2/442; B66F 9/0759
See application file for complete search history.

(56) References Cited

U.S. PATENT DOCUMENTS

| | | | |
|---|---|---|---|
| 5,951,106 A | 9/1999 | Hirama et al. | |
| 7,059,680 B2 * | 6/2006 | Billger | B60N 2/0224 297/217.2 |
| 7,121,608 B2 * | 10/2006 | Billger | B60N 2/002 296/65.06 |
| 7,347,299 B2 * | 3/2008 | Billger | B60N 2/002 180/326 |
| 7,350,866 B2 | 4/2008 | Billger et al. | |
| 7,758,007 B2 | 7/2010 | Link | |
| 8,827,345 B2 | 9/2014 | VanMiddendorp et al. | |
| 2015/0176249 A1 | 6/2015 | McKee | |
| 2015/0292182 A1 | 10/2015 | McKee | |

* cited by examiner

*Primary Examiner* — Russell Warren Frejd
(74) *Attorney, Agent, or Firm* — Mattingly Burke Cohen & Biederman

(57) ABSTRACT

A control system for a machine with a rotatable operator station includes sensors to produce data indicative of suitability and unsuitability of the machine for initiating and completing adjustment, respectively, between a first control configuration where the operator station is at a first orientation and a second control configuration where the operator station is at a second orientation. A control device in the control system transitions the control system between a locking state for inhibiting rotation of the operator station and an unlocking state for permitting rotation, based on the suitability data and the unsuitability data.

20 Claims, 5 Drawing Sheets

CONTROL SYSTEM AND OPERATING METHOD IN MACHINE HAVING ROTATABLE OPERATOR STATION

TECHNICAL FIELD

The present disclosure relates generally to a machine with an operator control station rotatable between a first angular orientation and a second angular orientation, and more particularly to controllably locking and unlocking the operator station to rotation based upon suitability of the machine for adjusting between different control configurations.

BACKGROUND

A functional and comfortable operator station is indispensable to productive and ergonomic operation of many types of modern machinery. Features such as a comfortable seat, armrests equipped with controls within easy reach, and various visual displays, touchscreens and the like positioned and oriented for easy viewing and access will be familiar to most persons working in the field of off-highway machines, certain marine vessels, and even some types of stationary construction or yarding equipment. The functional purposes of such machines often drive the design of operator stations, and in recent years the value and desirability of highly sophisticated operator stations has been increasingly recognized. Many operator stations are equipped with cushions or supporting bellows or the like for shock absorption, and many are equipped with various controls for adjusting angle or orientation of the seat or other parts of the operator station in three-dimensional space.

Certain machines, notably off-highway wheeled machines and tracked machines, are commonly operated in opposite directions. In other words, for certain machines and operations in certain environments, it is typical for an operator to drive the machine or operate equipment in one direction, and then alternate to a reverse direction. Skidder machines, known from the field of forestry equipment, are a typical example, where the operator might repeatedly drive the skidder forward, reverse it, drive forward again, and meanwhile utilize different work implements of the machine. Compactor machines likewise are often operated more or less equivalently in each of a forward direction and a reverse direction. To name another example, backhoes are typically constructed so that an operator can face forward to utilize a loading bucket at the front of the machine, or face rearward to operate an excavating bucket. For certain machines, the operator station itself may be rotated between a forward orientation and a rearward orientation, and the operator given the capability to reverse or adjust the manner in which the various controls operate implements of the machine and the like.

U.S. Pat. No. 8,827,345 is directed to an electro-mechanical seat swivel system where a bottom plate is mounted on a frame of a machine and a top plate pivotally mounted on the bottom plate, with an operator seat mounted to the top plate. The seat can lock in predetermined operator seat positions, and latch control switches disposed at operator controls to selectively allow the seat to be rotated among the predetermined operator seat positions.

SUMMARY OF THE INVENTION

In one aspect, a method of operating a machine includes receiving an operator request for adjustment of the machine from a first control configuration where an operator station of the machine is at a first angular orientation about an axis to a second control configuration where the operator station is rotated to a second angular orientation about the axis, and receiving data indicative of suitability of the machine for initiating the adjustment from the first control configuration to the second control configuration. The method further includes transitioning a control system in the machine from a locking state, for inhibiting rotation of the operator station, to an unlocking state, for permitting rotation of the operator station. The control system is transitioned based on the operator request and on the data indicative of suitability of the machine for initiating the adjustment, and the operator station is rotated after the control system is transitioned from the locking state to the unlocking state. The method further includes receiving data indicative of unsuitability of the machine for completing the adjustment from the first control configuration to the second control configuration, and transitioning the control system from the unlocking state to the locking state based on the data indicative of unsuitability of the machine for completing the adjustment.

In another aspect, a machine includes a frame, and an operator station adjustable relative to the frame between a first angular orientation about an axis and a second angular orientation about the axis. The machine further includes a control system having an input device configured to produce an operator request to adjust the machine between a first control configuration where the operator station is at the first angular orientation, and a second control configuration where the operator station is at the second angular orientation. The control system further includes at least one sensing mechanism, and a control device coupled with each of the input device and the at least one sensing mechanism. The at least one sensing mechanism is configured to produce data indicative of suitability of the machine for initiating the adjustment, and to produce data indicative of unsuitability of the machine for completing the adjustment. The control device is configured to transition the control system to an unlocking state, for permitting rotation of the operator station, or to a locking state, for inhibiting rotation of the operator station, based, respectively, on the data indicative of suitability of the machine for initiating the adjustment and the data indicative of unsuitability of the machine for completing the adjustment.

In still another aspect, a control system for a machine adjustable between a first control configuration where an operator station of the machine is at a first angular orientation about an axis, and a second control configuration where the operator station is rotated to a second angular orientation about the axis is provided. The control system includes at least one sensing mechanism coupled with a control device and configured to produce data indicative of suitability of the machine for initiating an adjustment between the first control configuration and the second control configuration. The at least one sensing mechanism is further configured to produce data indicative of unsuitability of the machine for completing the adjustment between the first control configuration and the second control configuration, and a control device coupled with the at least one sensing mechanism. The control device is configured to transition the control system to an unlocking state for permitting rotation of the operator station, based on the data indicative of suitability of the machine for initiating the adjustment between the first control configuration and the second control configuration. The control device is further configured to transition the control system from the unlocking state to a locking state for inhibiting rotation of the operator station, based on the data indicative of unsuitability of the machine for completing the adjustment.

DETAILED DESCRIPTION

Figure 1:
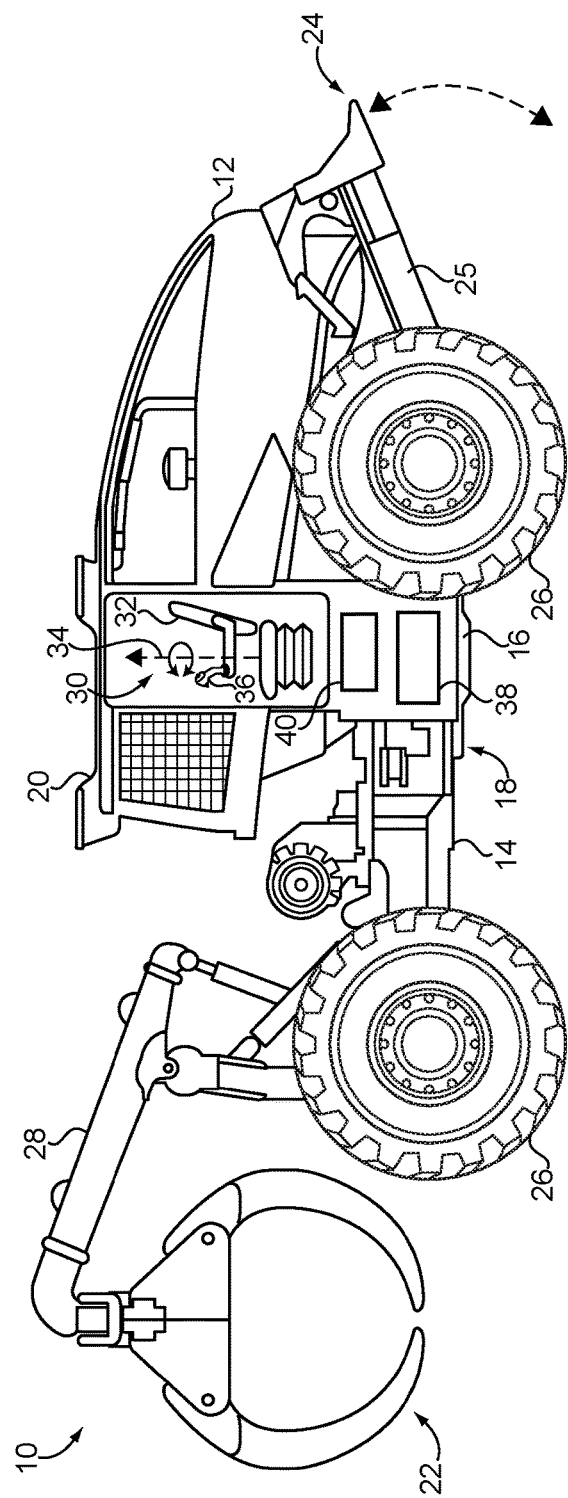
FIG. 1 is a side diagrammatic view of a machine, according to one embodiment.

Referring to FIG. 1, there is shown a machine 10, according to one embodiment, and including a frame 12 having a front frame unit 14 and a back frame unit 16, coupled together by way of an articulation joint 18. An operator cab 20 is mounted to back frame unit 16 and includes an operator station 30 from where an operator can control machine 10 and operate a front implement 22 and a back implement 24. Front implement 22 may include a grapple with a boom 28 that can be raised or lowered by an operator, whereas back implement 24 might include a blade with a support arm 25 analogously operable for raising and lowering. Machine 10 is shown in the context of an articulated wheel skidder such as for forestry applications, however, it should be appreciated that the present disclosure is not thereby limited and a variety of other machines are contemplated within the scope of the present disclosure. For example, machine 10 might include a track-type machine, a machine which is not articulated with respect to its frame, or still another type of machine. Applications are contemplated where machine 10 is a rail vehicle or not configured for ground travel at all.

Operator station 30 includes a seat 32 that is configured to swivel about a vertical axis 34 between a first angular orientation about axis 34 and a second angular orientation about axis 34. In FIG. 1, seat 32 is shown as it might appear facing forward for driving machine 10 in a forward direction and toward front implement 22. It can be appreciated that seat 32, and other elements of operator station 30, can be rotated 180 degrees from the first angular orientation depicted in FIG. 1 such that seat 32 is at a rearward facing orientation such as for operating implement 24 and driving machine 10 in reverse. Implement 22 and/or implement 24 could be operated from either of the first angular orientation of seat 32 or the second angular orientation of seat 32, and machine 10 can likewise be driven forward or driven in a reverse direction from either of the orientations of seat 32. It will nevertheless be appreciated that operator station 30 and seat 32 can be rotated between the first angular orientation and the second angular orientation where an operator desires to face a travel direction or work direction as the case may be. Operator station 30 further includes operator controls such as an operator input device 36. In some embodiments, machine 10 may be understood to be adjustable between a first control configuration where operator station 30 is at the first angular orientation and a second control configuration where operator station 30 is rotated to the second angular orientation. At the respective angular orientations about axis 34, the manner in which operator input device 36 and such other controls for machine 10 affect operation of machine 10 can be different.

For instance, when operator station 30 is at the first angular orientation and machine 10 is in the first control configuration, steering commands to vary an angle between front frame unit 14 and back frame unit 16 might adjust frame units 14 and 16 in a first direction. When operator station 30 is at the second angular orientation and machine 10 is in the second control configuration, the commands may have opposite effects. In a wheel steering implementation commands might be analogously varied based upon operator station orientation. In addition to steering commands, other operator commands relating to operation of machine 10 can be inverted depending upon the orientation of operator station 30, including gear shifting and/or directional commands, and potentially control commands for implement 22 or implement 24. Machine 10 further includes a control system 40 that is coupled with operator station 30, and also coupled with a powertrain system 38 in a manner and for purposes which will be apparent from the following description.

Figure 2:
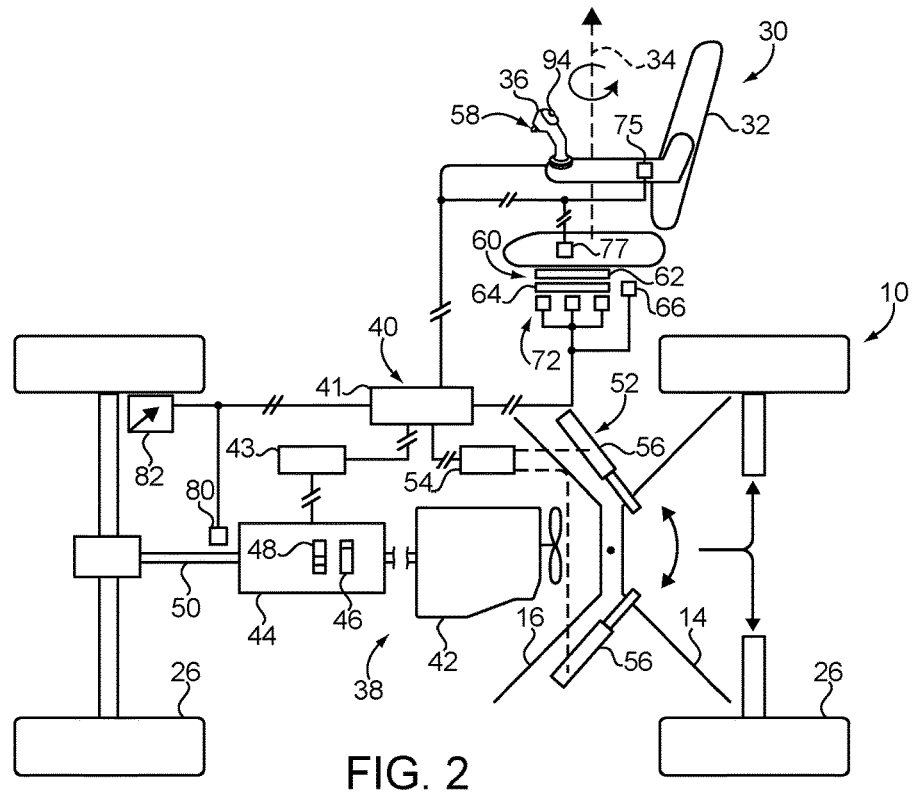
FIG. 2 is a diagrammatic view of portions of the machine of FIG. 1.

Referring now to FIG. 2, there is shown machine 10 with features of operator station 30, powertrain system 38, and still others in some further detail. Powertrain system 38 may include an engine 42, such as a conventional internal combustion diesel engine, that is coupled with a transmission 44 having a plurality of gears 46 and 48 and a transmission output shaft 50. Transmission 44 may include a mechanical transmission where gear 46 includes a forward gear, gear 48 includes a reverse gear, and transmission 44 can be placed in neutral. In other instances, a hydro-mechanical transmission, a hybrid transmission, or still another design could be used. Transmission 44 might include a plurality of forward gears and a plurality of reverse gears in other instances. Rotation of transmission output shaft 50 provides torque to ground engaging elements 26 coupled with back frame unit 16. Transmission output shaft 50, or some other configuration, such as hydraulic wheel motors, can provide torque to ground engaging elements 26 coupled with front frame unit 14. It should be appreciated that no particular powertrain configuration is intended by way of the present description. A brake 82 in the nature of a parking brake or a wheel brake can be engaged to inhibit ground travel of machine 10. As further discussed herein, in some instances brake 82 can be auto-engaged and auto-disengaged during adjustment of orientation of operator station 30.

Machine 10 further includes a steering system 52 that may include a plurality of steering actuators 56 configured to articulate front frame unit 14 relative to back frame unit 16 for purposes of steering machine 10. A valve assembly 54 is provided for controlling flows of hydraulic fluid to or from actuators 56. In an implementation, valve assembly 54 is configured to provide flows of hydraulic fluid to or from actuators 56 according to a forward pattern when operator station 30 is at the first angular orientation and machine 10 is in the first control configuration, and according to a reverse or inverted pattern when operator station 30 is at the second angular orientation. It will be appreciated that transmission 44 can be operated in a generally analogous manner, as further discussed herein. A transmission controller 43 may be coupled with transmission 44 and configured to output appropriate control commands. Transmission controller 43 may be a dedicated transmission control device, however, the present disclosure is not thereby limited. Another control device 41 can provide control commands to valve assembly 54, and also control various other aspects of operation of machine 10. Alternatively, a dedicated steering controller separate from control device 41 and separate from transmission controller 43 might be employed. As noted above, control system 40 can control various aspects of operation of machine 10, and in particular relating to control of machine 10 based upon the angular orientation presently occupied by operator station 30 and seat 32.

To this end, control system 40 may include a plurality of additional control components coupled with control device 41. Operator input device 36 may include a control lever or joystick that can be moved according to one or more degrees of freedom to steer machine 10 and/or accelerate or slow machine 10. Operator station 30 could also be equipped with control pedals for controlling a throttle, a brake, a steering wheel or other components relating to navigation and ground travel of machine 10. A separate control lever (not shown) might be provided for controlling one or both of implement 22 and implement 24. In the illustrated embodiment, input device 36 includes an FNR (forward, neutral, reverse) switch, button, or lever 94, for example, that can shift gears in transmission 44 between or among one or more forward gears, one or more reverse gears, and a neutral state. It will be recalled that, depending upon the present orientation of operator station 30, the outputs produced by FNR switch 94 can be interpreted in a forward pattern or a reverse pattern. In other words, control system 40 can be latched to a forward state or a reverse state. Operator input device 36 also includes a trigger 58 that can be pulled or otherwise actuated to produce an operator request to adjust machine 10 between the first control configuration where operator station 30 is at the first angular orientation, and a second control configuration where the operator station is at the second angular orientation. Those skilled in the art will appreciate that as an alternative to trigger 58, a button might be provided, a switch, or touchscreen, or any of a variety of other devices capable of producing an appropriate operator request as discussed herein.

Control system 40 further includes a plurality of sensors, or sensing mechanisms, including at least one sensing mechanism that is configured to produce data indicative of suitability of machine 10 for initiating an adjustment between the first control configuration and the second control configuration. As further discussed herein, the data indicative of suitability of machine 10 for initiating the adjustment can include data of a variety of different types that is associated with operating parameters of machine 10 that bear on whether adjustment between the first control configuration and the second control configuration is appropriate or desirable. In an implementation, the at least one sensing mechanism includes a sensor 80 configured to monitor a ground travel parameter of machine 10. The ground travel parameter can include ground speed, and sensor 80 can include a sensor configured to produce data indicative of a value of ground speed by monitoring transmission output shaft speed. Other conditions bearing on suitability of machine 10 for initiating the adjustment can include such factors as operator presence, indicated by an operator presence sensor such as a seat weight sensor 77. Another factor affecting suitability for initiating the adjustment could be armrest position, indicated by an armrest position sensor 75. In still other instances, the data indicative of suitability of machine 10 for initiating the adjustment could include factors relating to operation or position of implements, slope upon which machine 10 is situated, articulation angle, wheel slip, transmission gear, whether machine 10 is accelerating or not, whether machine 10 is braking or not, and a host of other exemplary operating parameters. Still other factors that can bear on suitability of machine 10 for initiating the adjustment could include the presence or absence of fault conditions, such as mechanical fault conditions, fluid pressures, temperatures, sensor states, or a variety of other conditions that can be interpreted in control system 40 as a fault that affects suitability of machine 10 for initiating the adjustment.

The at least one sensing mechanism may be further configured to produce data indicative of unsuitability of machine 10 for completing the adjustment. Any of the same factors or operating parameters that are monitored to produce data indicative of suitability of machine 10 for initiating the adjustment can bear on unsuitability of machine 10 for completing the adjustment. Control system 40 may further determine whether machine 10 is unsuited for completing the adjustment based upon different factors, as further discussed herein. Control device 41 may further be configured to transition control system 40 from a locking state, for inhibiting rotation of operator station 30, to an unlocking state, for permitting rotation of operator station 30, based on the data indicative of suitability of machine 10 for initiating the adjustment between the first control configuration and the second control configuration. Control device 41 may further be configured to transition control system 40 from the unlocking state back to the locking state based on the data indicative of unsuitability of machine 10 for completing the adjustment.

It can therefore be understood that control system 40 may function to allow an operator to commence rotation of seat 32 to transition between the first control configuration and the second control configuration, but prohibit completion of the transition. By way of example, one can conceptualize a state where machine 10 has a ground speed that is zero, representing data indicative of suitability of machine 10 for initiating the adjustment from the first control configuration to the second control configuration. As such, control device 41 could command unlocking seat 32 to rotation, as further discussed herein. During rotating seat 32 from the first angular orientation but prior to reaching the second angular orientation, it might be observed that machine 10 has a ground speed that is non-zero, representing data indicative of unsuitability of machine 10 for completing the adjustment. Based on the data indicative of unsuitability, control system 40 may be transitioned to the locking state. Other examples of factors that might justify returning control system 40 to a locking state include an observation that the operator is not present as might be indicated by sensor 77, that the armrest is raised as might be indicated by sensor 75, or other factors or conditions relating to fault conditions, expiration of timers, or interruption of the operator request for the adjustment such as might occur where trigger 58 is no longer pressed. Reasons why such conditions or factors justify returning control system 40 to the locking state generally relate to optimizing operating efficiency and avoidance of damage or undue wear on machine 10, protection of the operator or other persons, prevention of collision with objects in the work environment, and still other factors that will be apparent to those skilled in the art. Further exemplary factors and conditions justifying returning control system 40 to the locking state will be apparent from the following description.

Operator station 30 further includes a seat base 60 configured to support seat 32 for rotation, and including a first seat plate 62 that may be fixed relative to seat 32, and a second seat plate 64 that may be fixed relative to frame 12. A latch mechanism 66 that controls whether seat 32 is in a locking state or an unlocking state may be coupled with seat base 60. As used herein, a locking state of latch mechanism 66 is a state where latch mechanism 66 locks seat 32 from rotation or imparts a tendency for seat 32 to become locked from rotation. An unlocking state of latch mechanism 66 is a state where latch mechanism 66 does not lock seat 32 from rotation or imparts a tendency for seat 32 to not be locked from rotation. In reference to control system 40 itself, a locking state and an unlocking state are to be analogously understood. A sensor group 72 including a plurality of sensors associated with seat base 60 is further provided, and discussed in greater detail below.

Figure 3:
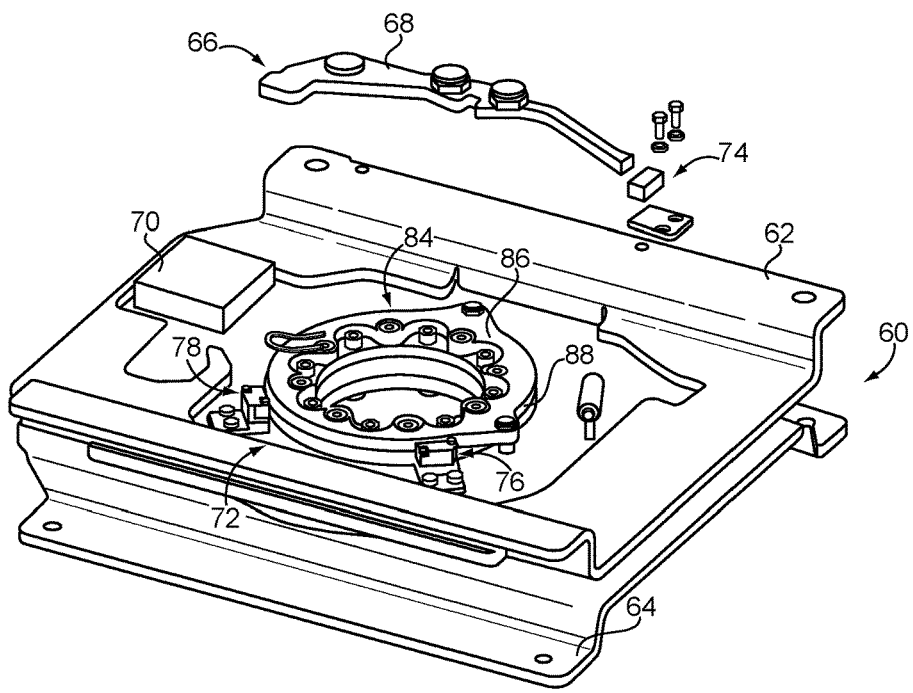
FIG. 3 is a disassembled view of portions of a seat base, according to one embodiment.

Referring now to FIG. 3, there is shown seat base 60 and components thereof in some detail. In FIG. 3 a latch mechanism 66 is partially disassembled from other components of seat base 60, and includes a lever 68 configured to couple with an actuator 70. Actuator 70 may include an electrical actuator coupled with control device 41, and that can be varied between a first electrical energy state at which lever 68 has a first position or tendency to assume a first position and a second electrical energy state at which lever 68 has a second position or tendency to assume a second position. Sensor group 72 is shown in FIG. 3, including a first sensor 76 and a second sensor 78 that are each associated with a catch assembly 84 including a catch wheel 86. A third sensor 74 is shown disassembled and is configured to sense a position of lever 68, the significance of which will be further apparent from the following description.

In one implementation, each of sensor 76, sensor 78, and sensor 74 includes a proximity sensor such as a Hall effect sensor. Contact sensors, linear or rotary potentiometers, or still others could also be used. Catch wheel 86 has an outer surface 88 with a non-uniform contour. Regions of outer surface 88, more particularly, radially outward regions or protrusions that may be too minute to illustrate in the attached Figures, may be detected when in proximity with sensors 76 or 78, enabling different angular orientations of catch wheel 86 to be detected and thereby the first orientation and the second orientation of seat 32, and possibly other orientations, to be detected. Sensors 76 and 78 may therefore have among them a plurality of different output states indicative of whether seat 32 is at the first angular orientation or the second angular orientation. When control system 40 is transitioned from the unlocking state to the locking state, seat 32 may be positioned at a third angular orientation that is between the first angular orientation and the second angular orientation, for instance the orientation depicted at FIG. 5.

Figure 4:
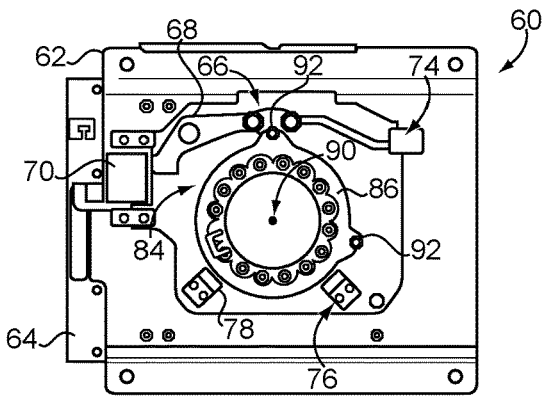
FIG. 4 is an elevational view of a seat base, according to one embodiment, in a first configuration.
Figure 5:
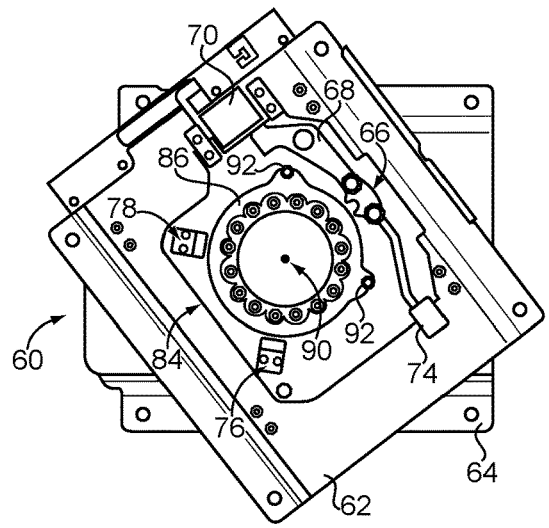
FIG. 5 is an elevational view of the seat base in another configuration.
Figure 6:
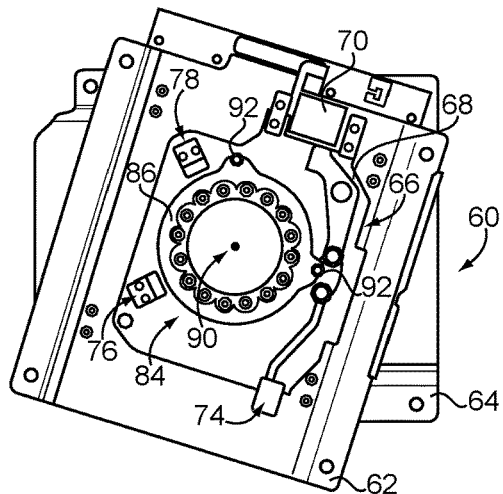
FIG. 6 is an elevational view of the seat base in yet another configuration.

Referring now to FIG. 4, there is shown seat base 60 as it might appear where latch mechanism 66 is in a locking state and such that lever 68 is engaged with a first complementary structure 92 on catch wheel 86. At the state depicted in FIG. 4 actuator 70 may be in a first electrical energy state such as it might occupy when control system 40 is in a locking state. Referring to FIG. 5, there is shown seat base 60 as it might appear where plate 62 has been rotated relative to plate 64. Catch wheel 86 has remained stationary. Lever 68 has been rotated with plate 62 away from first complementary structure 92 and toward a second complementary structure 92. At the state depicted in FIG. 5 control system 40 may remain in the locking state. It should also be appreciated that seat base 60 may have the configuration depicted at FIG. 5 when control system 40 is transitioned to the locking state prior to completing adjustment of machine 10 between the first control configuration and the second control configuration. In FIG. 6, plate 62 has been further rotated relative to plate 64 such that lever 68 engages with second complementary structure 92.

INDUSTRIAL APPLICABILITY

Figure 7:
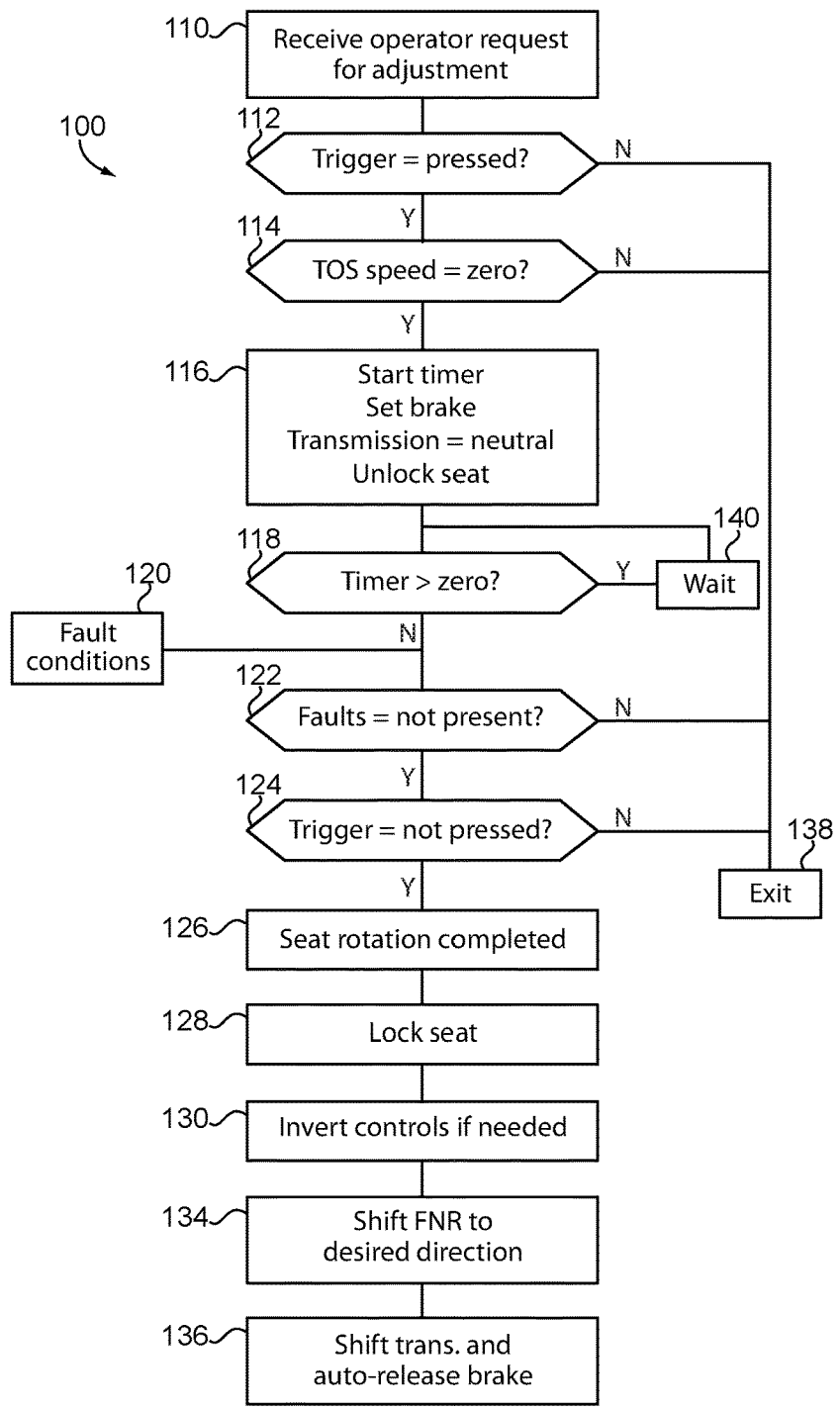
FIG. 7 is a flowchart illustrating control logic and process flow, according to one embodiment.

Referring now to FIG. 7, there is shown a flowchart 100 illustrating control logic and process flow that might be executed and observed where operator station 30 is adjusted from the first control configuration to the second control configuration, or vice versa. At block 110 the operator request for adjustment is received, and the process can then advance to block 112 to query whether trigger=pressed? If no, the operator request may have been interrupted and the process may advance to exit at block 138, or could otherwise loop back or proceed to some other function. From block 112 the process may advance to block 114 to query is TOS (transmission output speed)=0? If no, the process can advance to block 138 to exit, loop back, et cetera. If yes, the process advances to block 116 to start a timer, set brake 82, and shift transmission to neutral.

At block 116 control system 40 can be transitioned to the unlocking state, and control device 41 can output a command to actuator 70 to unlock seat 32 to rotation. With seat 32 unlocked, the operator can attempt to rotate seat 32 toward the opposite, second angular orientation. Typically, although not necessarily, seat 32 may be rotated manually by the operator. At block 118 the process may query is the timer >0? If yes, the process might advance to block 140 to execute a wait cycle, and then loop back. If no, the process may advance to block 122 to query are faults=not present? Fault conditions are presented at block 120, for example, however, it should be appreciated that monitoring and detection of faults may be continuous or at least periodic throughout the process flow depicted in FIG. 7. If, at block 122, faults=not present is not true, the process may advance to block 138 to exit. If faults=not present is true at block 122, the process may advance to block 124 to query is trigger=not pressed? If no, the process may exit. If yes, the process can advance to block 126 to complete seat rotation. At block 126, the process may advance to block 128 to lock seat 32. From block 128, the process may advance to block 130 to invert controls if needed. Control system 40 may latch in a forward pattern or a reverse pattern based upon the orientation of seat 32, as indicated by inputs from sensor group 172. From block 130, the process may advance to block 134 to shift FNR (for example forward, neutral, reverse) switch 94 to desired direction. Typically the operator will be shifting FNR switch 94 although the process could be automated. From block 134 the process may advance to block 136 to shift the transmission and auto-release brake 82.

Figure 8:
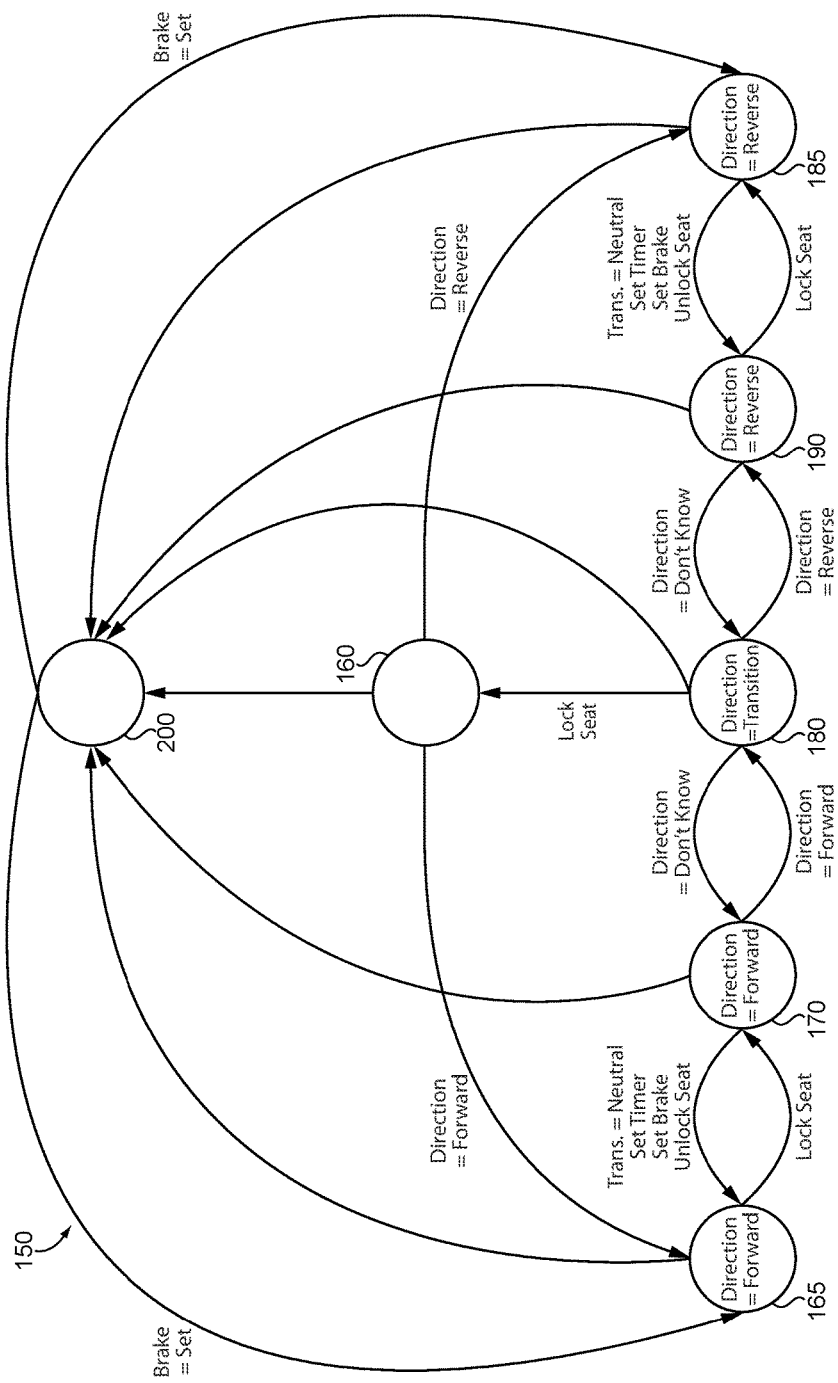
FIG. 8 is a state diagram, according to one embodiment.

Referring now to FIG. 8, there is shown a state diagram 150 illustrating a plurality of different states in an algorithm executed by control device 41, in at least certain implementations, during adjustment of machine 10 between the first control configuration and the second control configuration. It will be appreciated that the algorithm can transition among the various states based upon the occurrence and/or clearing of faults, ground speed, transmission gear or change in transmission gear, varying of trigger 58 between a pressed or otherwise actuated state and a not-pressed and not actuated state, engagement and release of brake 82, the state of a timer, locking and unlocking of mechanism 66 and/or seat 32 to rotation, and adjustments in orientation of seat 32 between the first orientation and the second orientation. These and potentially still other factors relate to suitability of machine 10 for transitioning between the first control configuration and the second control configuration, and unsuitability of machine 10 for completing the adjustment between the first control configuration and the second control configuration as discussed herein.

At a state 165 where control system 40 is latched for forward operation, the following conditions might be observed: trigger=not pressed, faults=not present, direction=forward, TOS=don't care, park brake=don't care, lock lever=locked, and timer=zero. At a state 170 where control system 40 is latched for forward operation the following conditions might be observed: trigger=pressed, faults=not present, direction=forward, TOS=zero, park brake=set, lock lever=unlocked, timer >zero. At a state 180 where control system 40 is not latched for either forward operation or reverse operation the following conditions might be observed: trigger=pressed, faults=not present, direction=transition, TOS=zero, park brake=set, lock lever=unlocked, timer=don't care. At a state 190 where control system 40 is latched for reverse operation the following conditions might be observed: trigger=pressed, faults=not present, direction=reverse, TOS=zero, park brake=set, lock lever=unlocked, timer >zero. At a state 185 where control system 40 is latched for reverse operation, the following conditions might be observed: trigger=not pressed, faults=not present, direction=reverse, TOS=don't care, park brake=don't care, lock lever=locked, timer=zero. If faults occur at any of states 165, 170, 180, 190, or 185, the algorithm may transition to a fault state 200. Where the fault state is cleared, the algorithm may transition to one of state 165 or state 185, which can each be understood as a safe state, with brake=set indicating brake 82 is maintained engaged and must be manually disengaged by the operator.

From either of state 165 or state 185 when trigger 58 is pressed the algorithm may transition, respectively, to state 170 or state 190 so long as conditions of machine 10 are suitable for initiating the adjustment from the first control configuration to the second control configuration as discussed herein. Transitioning from either of state 165 or state 185 to the corresponding state 170 or state 190 can include setting a timer, commanding engaging brake 82, commanding unlocking seat 32 to rotation, and commanding shifting transmission 44 to neutral. If, at state 170 or state 190, it is observed that trigger 58 is not pressed or that the timer expires, a lock seat action may be executed, returning to state 165 or state 185, corresponding to unsuitability of machine 10 for completing the requested adjustment as described herein.

From either of state 170 or state 190 the algorithm may transition to state 180 where the direction is indeterminate (direction=transition). From state 180 if direction is determined to be forward the algorithm may transition to state 170. If the direction is determined to be reverse the algorithm may transition from state 180 to state 190. If at state 180 trigger 58 is not pressed an action to lock seat may be taken and the algorithm may transition to state 160. At state 160 if a fault condition is detected the algorithm will transition to fault state 200. Otherwise from state 160 the algorithm may transition to state 165 if direction=forward, and to state 185 if direction=reverse.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a machine, the method comprising:
   receiving an operator request for adjustment of the machine from a first control configuration where an operator station of the machine that includes a seat is at a first angular orientation about an axis to a second control configuration where the operator station is rotated to a second angular orientation about the axis;
   receiving data indicative of suitability of the machine for initiating the adjustment from the first control configuration to the second control configuration;
   transitioning a control system in the machine from a locking state, for inhibiting rotation of the operator station, to an unlocking state, for permitting rotation of the operator station;
     the control system being transitioned based on the operator request and the data indicative of suitability of the machine for initiating the adjustment; and
     the operator station being rotated after the control system is transitioned from the locking state to the unlocking state;
   receiving data indicative of unsuitability of the machine for completing the adjustment from the first control configuration to the second control configuration after transitioning the control system from the locking state to the unlocking state; and
   transitioning the control system from the unlocking state to the locking state based on the data indicative of unsuitability of the machine for completing the adjustment;
   determining at which of the first angular orientation or the second angular orientation the operator station is positioned;
   latching the control system to a forward state or a reverse state, based on the transitioning of the control system from the unlocking state to the locking state and the determining at which of the first angular orientation or the second angular orientation the operator station is positioned; and
   outputting control commands to at least one of a steering system or a transmission system in the machine in one of a forward pattern or a reverse pattern based, respectively, on whether the control system is latched to the forward state or the reverse state.

2. The method of claim 1 wherein receiving data indicative of unsuitability of the machine for completing the adjustment includes receiving data indicative of at least one of a fault condition, expiration of a timer, a value of a ground travel parameter of the machine, a transmission gear or a change in transmission gear, or an interruption of the operator request.

3. The method of claim 2 wherein the data indicative of unsuitability includes data indicative of a value of the ground travel parameter, and wherein the ground travel parameter includes a ground speed of the machine.

4. The method of claim 2 wherein transitioning the control system from the locking state to the unlocking state further includes commanding shifting a transmission in the machine to neutral and commanding engaging a brake in the machine.

5. The method of claim 4 wherein transitioning the control system from the locking state to the unlocking state further includes commanding unlocking the operator station to rotation based on engagement of the brake.

6. The method of claim 2 wherein:
the seat is rotatable between a forward orientation in the machine at the first angular orientation and a reverse orientation in the machine at the second angular orientation;
receiving an operator request for adjustment of the machine further includes receiving an operator request that is based on an actuation state of a trigger at the operator station; and
receiving data indicative of unsuitability of the machine for completing the adjustment further includes receiving data indicative of an interruption of the operator request caused by a change in the actuation state of the trigger.

7. The method of claim 6 wherein transitioning the control system from the unlocking state back to the locking state occurs when the seat is at a third angular orientation about the axis that is between the first angular orientation and the second angular orientation.

8. A machine comprising:
a frame;
an operator station including a seat, and being adjustable relative to the frame between a first angular orientation about an axis and a second angular orientation about the axis;
a control system including an input device configured to produce an operator request to adjust the machine between a first control configuration where the operator station is at the first angular orientation, and a second control configuration where the operator station is at the second angular orientation;
the control system further including at least one sensing mechanism and at least one control device coupled with each of the input device and the at least one sensing mechanism;
the at least one sensing mechanism being configured to produce data indicative of suitability of the machine for initiating the adjustment, and to produce data indicative of unsuitability of the machine for completing the adjustment; and
the at least one control device being configured to:
transition the control system from a locking state, for inhibiting rotation of the operator station, to an unlocking state, for permitting rotation of the operator station, based on the data indicative of suitability of the machine for initiating the adjustment; and
transition the control system from the unlocking state to the locking state based on the data indicative of unsuitability of the machine for completing the adjustment; and
the at least one control device being further configured to:
output control commands to at least one of a transmission system or a steering system in the machine according to a forward pattern when the operator station is at the first angular orientation and according to a reverse pattern when the operator station is at the second angular orientation;
determine at which of the first angular orientation or the second angular orientation the operator station is positioned; and latch the control system to one of a forward state for outputting the control commands in a forward pattern or a reverse state for outputting the control commands in a reverse pattern, based on the transitioning of the control system from the unlocking state to the locking state and the determining at which of the first angular orientation or the second angular orientation the operator station is positioned.

9. The machine of claim 8 wherein the first angular orientation includes a forward orientation of the seat, and wherein the second angular orientation includes a reverse orientation of the seat.

10. The machine of claim 9 wherein the at least one sensing mechanism includes a sensor configured to monitor a ground travel parameter of the machine.

11. The machine of claim 10 wherein the at least one sensing mechanism further includes a plurality of sensors coupled with the operator station, and the plurality of sensors providing a plurality of different output states indicative of whether the seat is at the first angular orientation or the second angular orientation.

12. The machine of claim 8 wherein the at least one control device includes a first control device configured to output the control commands to the transmission system and a second control device configured to output the control commands to the steering system.

13. The machine of claim 8 wherein the at least one control device is further configured to command a first electrical energy state of a seat lock actuator in the locking state of the control system, and to command a second electrical energy state of the seat lock actuator in the unlocking state of the control system.

14. The machine of claim 8 wherein the at least one control device is further configured to command shifting a transmission in the machine to neutral and to command engaging a brake in the machine, based on the data indicative of suitability of the machine for initiating the adjustment.

15. The machine of claim 14 wherein the at least one control device is further configured to disable auto-disengagement of the brake based on the data indicative of unsuitability of the machine for completing the adjustment.

16. A control system for a machine adjustable between a first control configuration where an operator station of the machine that includes a seat is at a first angular orientation about an axis, and a second control configuration where the operator station is rotated to a second angular orientation about the axis, the control system comprising:
at least one sensing mechanism coupled with the control device and configured to produce data indicative of suitability of the machine for initiating an adjustment between the first control configuration and the second control configuration;
at least one control device coupled with the at least one sensing mechanism, the at least one control device being configured to:
transition the control system to an unlocking state for permitting rotation of the operator station, based on the data indicative of suitability of the machine for initiating the adjustment between the first control configuration and the second control configuration;
transition the control system from the unlocking state to a locking state for inhibiting rotation of the operator station;
output control commands to at least one of a transmission system or a steering system in the machine according to a forward pattern when the operator station is at the first angular orientation and according to a reverse pattern when the operator station is at the second angular orientation;

determine at which of the first angular orientation or the second angular orientation the operator station is positioned; and latch the control system to one of a forward state for outputting the control commands in the forward pattern or a reverse state for outputting the control commands in the reverse pattern, based on the transitioning of the control system from the unlocking state to the locking state and the determining at which of the first angular orientation or the second angular orientation the operator station is positioned.

17. The control system of claim 16 further comprising an operator input device coupled with the at least one control device and configured to produce an operator request for adjustment of the control system from the locking state to the unlocking state.

18. The control system of claim 17 wherein the data indicative of unsuitability includes data indicative of at least one of expiration of a timer, a value of a ground travel parameter of the machine, a transmission gear or a change in transmission gear, or an interruption of the operator request.

19. The control system of claim 18 wherein the at least one control device is further configured to command shifting a transmission in the machine to neutral and to command engaging a brake in the machine, based on the data indicative of suitability of the machine for initiating the adjustment.

20. The control system of claim 19 wherein:

the at least one sensing mechanism is further configured to produce data indicative of unsuitability of the machine for completing the adjustment between the first control configuration and the second control configuration; and the at least one control device is further configured to command disabling auto-disengagement of the brake based on the data indicative of unsuitability of the machine for completing the adjustment.

\* \* \* \* \*